Figure 1:
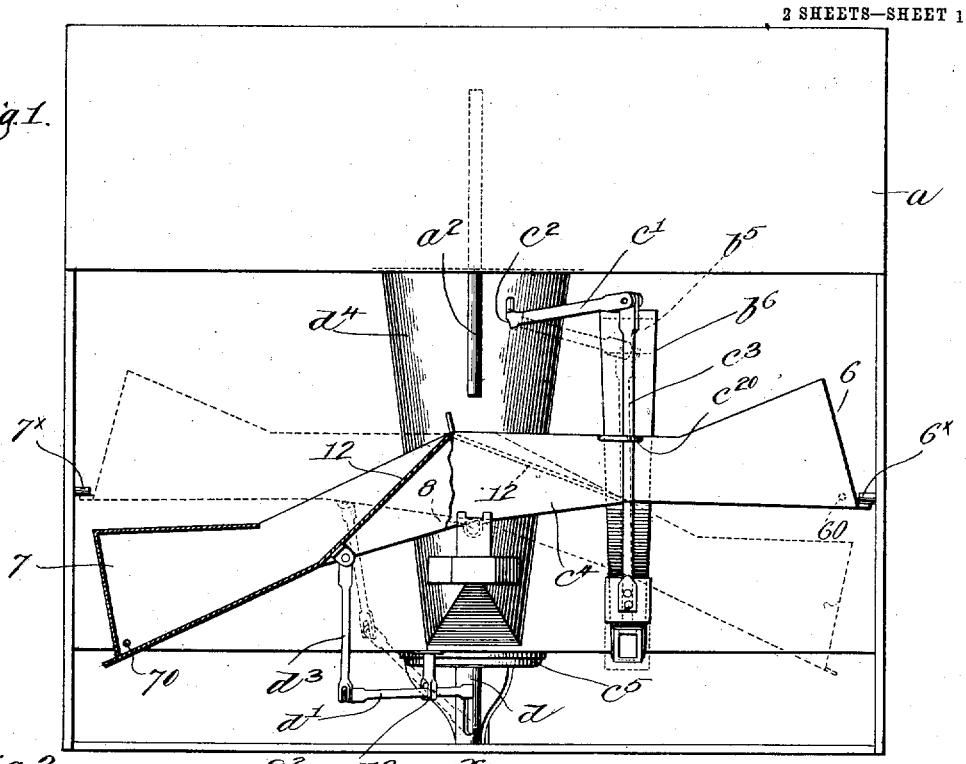

No. 12,125. REISSUED JUNE 23, 1903.

C. S. L. KENNEDY.

PHOTOGRAPHIC BATH APPARATUS.

APPLICATION FILED MAR. 5, 1903.

2 SHEETS—SHEET 1.

Witnesses.
W. C. Sims Jr.
G. Wm. Lutton.

Inventor.
Charles S. L. Kennedy.
by Wesley Gregory.
Atty's.

THE NORRIS PETERS CO., PHOTO-LITHO., WASHINGTON, D. C.

No. 12,125. REISSUED JUNE 23, 1903.

C. S. L. KENNEDY.

PHOTOGRAPHIC BATH APPARATUS.

APPLICATION FILED MAR. 5, 1903.

2 SHEETS—SHEET 2.

Witnesses.
H. C. Lunsford.
J. Wm. Lutton.

Inventor.
Charles S. L. Kennedy,
by Crosby & Gregory.
Attys.

THE NORRIS PETERS CO., PHOTO-LITHO., WASHINGTON, D. C.

No. 12,125. Reissued June 23, 1903.

UNITED STATES PATENT OFFICE.

CHARLES S. L. KENNEDY, OF NORTH EASTON, MASSACHUSETTS

PHOTOGRAPHIC BATH APPARATUS.

SPECIFICATION forming part of Reissued Letters Patent No. 12,125, dated June 23, 1903.

Original No. 711,978, dated October 28, 1902. Application for reissue filed March 5, 1903. Serial No. 146,426

*To all whom it may concern:*

Be it known that I, CHARLES S. L. KENNEDY, a citizen of the United States, and a resident of North Easton, in the county of Bristol and State of Massachusetts, have invented an Improvement in Photographic Bath Apparatus, of which the following description, in connection with the accompanying drawings, is a specification, like characters representing like parts.

This invention has for its object the production of a novel apparatus for use by photographers for washing negatives and prints. As this work is now commonly done the plates are left to stand in water and the prints and films are commonly laid in running water. I have found by experiment that the prints are better washed when suspended for a definite length of time in what may be considered still water than when laid in running water, so long as the water in which the prints are suspended is changed frequently. Changing the water frequently rather than employing running water results in economy of water, which in cities is important.

In my invention I have provided a main reservoir to contain water and have operatively connected with it an auxiliary reservoir or reservoirs in which I may suspend prints or films or may stand up or sustain glass plates. I have provided the main and auxiliary reservoirs each with a suitable valve or equivalent, whereby the water may be permitted to leave the main reservoir and enter the auxiliary reservoir and may be permitted to leave the auxiliary reservoir at stated intervals of time. I have provided, as herein shown, a beam or lever which is suitably connected with said valves to open and close them, and the time of operation of the beam is controlled by the flowing of a small stream of water; but this invention is not in all cases limited to the use of a beam actuated by water to open and close the valves periodically, and instead I may use any other suitable or equivalent mechanical device. By suspending the prints or films in water all liability of injury thereto, which is common when the films are laid one on top of another in water, is obviated.

Figure 2:
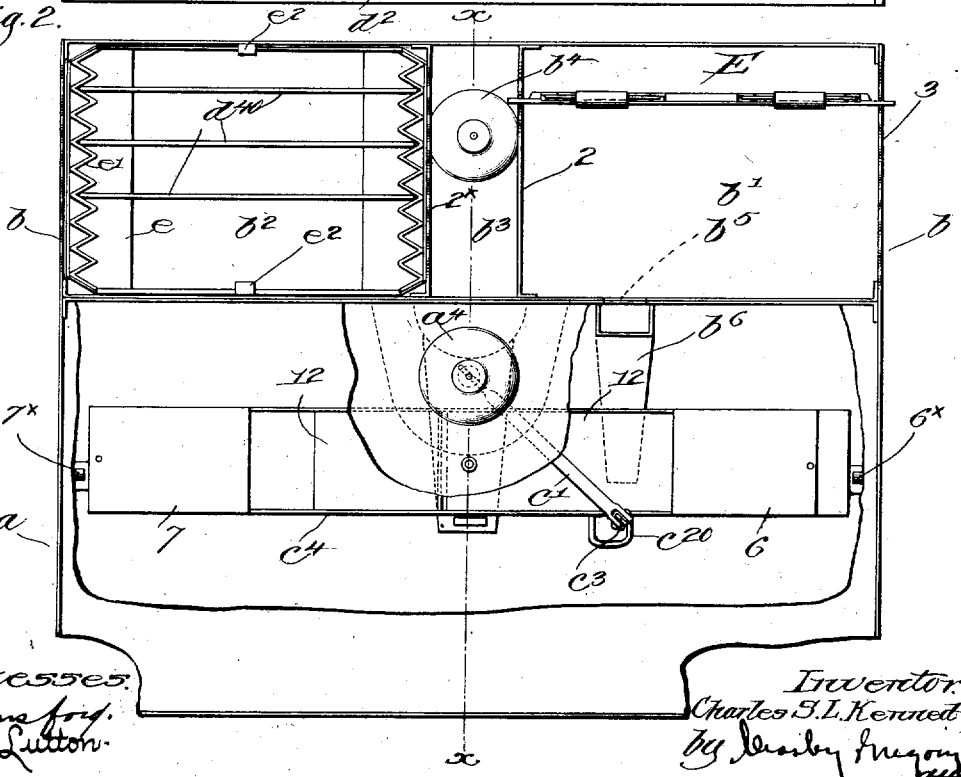
Figure 3:
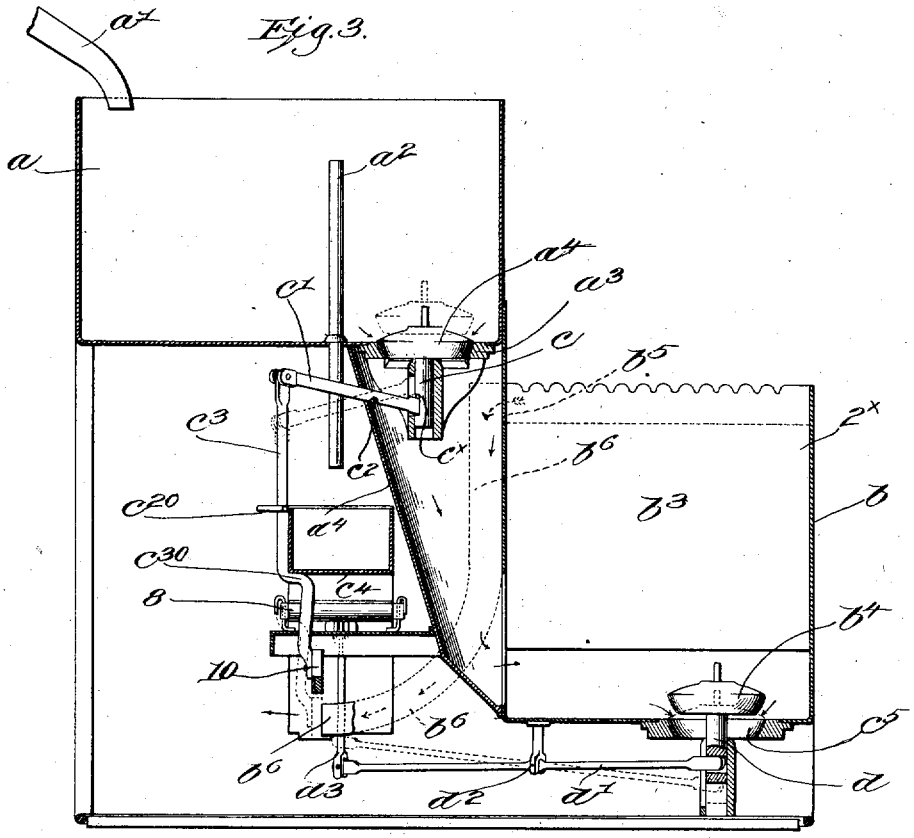
Figure 4:
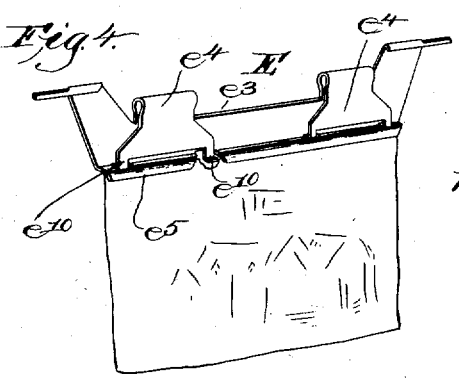
Figure 5:
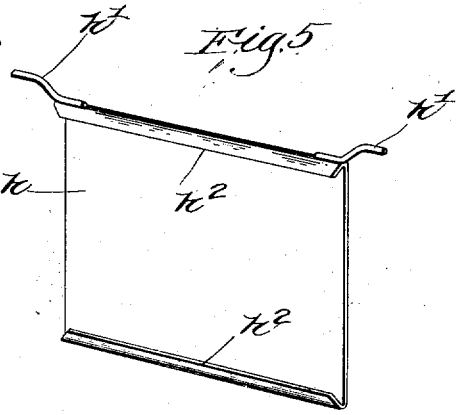

Figure 1 is a rear side elevation of one form of apparatus embodying my invention in one of the best forms now known to me. Fig. 2 is a plan view thereof with the bottom of the main reservoir partially broken out. Fig. 3 is a section in the line $x\ x$, but showing in full lines some of the parts at the right of the section-line, Fig. 2. Fig. 4 is a detail to be referred to. Fig. 5 shows a film-holder such as may be used.

The main reservoir $a$, supplied with water, it may be, from any suitable source, as a spigot $a'$, has a small overflow-pipe $a^2$, out through which water will flow when the reservoir is filled even with the top of the pipe $a^2$. The bottom of the reservoir has a valve-seat $a^3$, with which coacts a valve $a^4$. Alongside of the main reservoir and shown as located at a lower level is an auxiliary reservoir $b$, divided, as shown in Fig. 2, to form two smaller reservoirs $b'$ $b^2$, with the central space or chamber $b^3$ between the dividing-walls 2 and $2^\times$ extending only part way toward the bottom of reservoir $b$, so that the compartments $b'$, $b^2$, and $b^3$ are in communication. The reservoir $b$ has a valve $b^4$ and an overflow-opening at $b^5$, from which leads a conduit $b^6$. The valve $b^4$ is located in the chamber $b^3$, (see Fig. 2,) and the opening $b^5$ at the upper end of the conduit $b^6$ communicates directly with the compartment or small reservoir $b'$. (See Fig. 2.) The valve $a^4$ has a depending stem $c$, (see Fig. 3,) notched at one side, as $c^\times$, to be engaged by a lever $c'$, having its fulcrum at $c^2$, and said lever has connected to its opposite end a link $c^3$, suitably shaped to be depressed by any suitable actuating device, herein shown as a beam $c^4$, pivoted at 8 and having its ends 6 and 7 shaped to receive water from the overflow-pipe $a^2$. The lower end of the link $c^3$ is provided with a closure or face 10, that at times acts to close the open lower end of the conduit $b^6$. The valve $b^4$, coacting with the seat $c^5$, has its stem $d$ engaged by a valve-mover, shown as a lever $d'$, having its fulcrum at $d^2$ and suitably connected with the beam $c^4$ by a link $d^3$. The valve $a^4$ closes a passage $d^4$, leading into the middle compartment $b^3$ of the reservoir $b$. To sustain the glass-plate negatives $d^{40}$ in the division $b^2$ of the reservoir $b$, I have provided a metallic basket composed of a bottom plate $e$, notched side walls $e'$, and suitable upright rods $e^2$, by which to lift the basket from and put it into the reservoir.

The end walls 2 3 of the portion $b'$ of the reservoir $b$ are suitably notched or otherwise shaped to sustain a print-holder E, one good form of which I have shown detached in Fig. 4. The holder shown is composed of a bar $e^3$ and one or more spring-clips $e^4$, the bar having a downturned rim or ledge $e^5$, against which the spring-prongs $e^{10}$ of the holder nip and hold the edge of the print to be suspended in the water in the reservoir $b$.

Suspending the prints or films at one edge better exposes them to the action of the water and prevents one print or film from rubbing against another.

The depending link $c^3$ extends in front of the beam and passes loosely through a guide-eye or staple $c^{20}$ thereon, and, as shown in Fig. 3, the link is bent at $c^{30}$ to extend beneath the bottom of the beam, the link when in raised position assuming the position shown in Fig. 3 and coöperating with the beam. The latter has two inclines 12 extending in opposite sides from its center, (see Fig. 1,) the apex of the inclines being at the top of the beam, and the said inclines slope outwardly toward the compartments 6 and 7. The weight of the valve $b^4$ will usually be sufficient to hold the beam in dotted-line position, Fig. 1, and of course if there is water in the auxiliary reservoir it will additionally act to retain the said valve seated.

In operation then let it be assumed that the glass-plate negatives and prints or films are properly inserted in the chambers $b'$ and $b^2$ of the reservoir $b$ and that the beam occupies the dotted-line position, Fig. 1, the valve $a^4$ being opened, the valve $b^4$ closed, as shown by dotted lines in Fig. 3. Water is permitted to enter the reservoir $a$ and will flow directly through the passage $d^4$ into the auxiliary reservoir, filling the several chambers thereof until the water-level reaches the opening $b^5$. The water will then flow down the conduit and by its weight opens the closure 10, the force of the water swinging the link $c^3$ outwardly and withdrawing the bend $c^{30}$ from beneath the beam. Immediately the weight of the valve $a^4$, which is greater than the weight of the link $c^3$ and the parts carried thereby, drops on its seat, closing the communication between the reservoirs $a$ and $b$, and thereupon the reservoir $a$ will begin to fill, the beam, however, still remaining in dotted-line position, Fig. 1. When the water-level in reservoir $a$ reaches the top of the pipe $a^2$, the water will flow through said pipe and onto the incline 12 at the left-hand side of the fulcrum of the beam, filling the end 7 of the latter and turning the beam into full-line position, Fig. 1, a small quantity of water sufficing to turn the beam, the water entering the box-like end 7 of the beam faster from the pipe $a^2$ than it can be discharged through the small hole 70. As the beam turns from dotted to full line position, Fig. 1, it acts, through the lever $d'$ and link $d^3$, to open the valve $b^4$, permitting the water therein to flow from the several chambers $b'$, $b^2$, and $b^3$, the valve $a^4$ still remaining closed, the link $c^3$ having swung back into place, with the bend $c^{30}$ beneath the end 6 of the beam when the latter assumed the full-line position shown in Fig. 1. The reservoir $b$ having been emptied is in readiness to receive a fresh supply from the reservoir $a$, it being remembered that the latter has been filled before the discharging of the reservoir $b$. Now with the parts in the full-line position, Fig. 1, when the water overflows through pipe $a^2$ it will fall on the incline at the right-hand side of the fulcrum of the beam, filling the end 6 and quickly turning the beam into dotted-line position, Fig. 1, and the valve $b^4$ is closed and valve $a^4$ opened, so that the water from the reservoir $a$ passes through the passage $d^4$ and into the reservoir $b$ to fill the latter. The movement of the beam to dotted-line position causes the closure 10 to cover the lower end of the conduit $b^6$, the beam acting on the bend $c^{30}$ to depress the link $c^3$ for that purpose. Of course as soon as the water begins to flow through the large valve-seat $a^3$ it will cease to flow through the pipe $a^2$, and the compartment 6 of the beam empties itself through the hole 60.

The operation described is repeated automatically as long as water is permitted to run into the reservoir $a$, the latter being filled to overflowing, tipping the beam to open the valve $a^4$ and close the valve $b^4$. Then when the reservoir $b$ is filled and overflows through the conduit $b^6$ the valve $a^4$ is released by or through the action of the overflow-water on the closure 10 and the valve $a^4$ seats itself, while valve $b^4$ is opened automatically, and so on. Stops $6^\times$ and $7^\times$ are shown in Fig. 1 to limit the swinging movement of the beam in one or the other direction.

Fig. 5 shows a film-holder $h$, having suitable projections $h'$, by which it may be sustained on the walls of the reservoir $b$, said holder having inturned ends $h^2$, behind which may be engaged the ends of the film.

The compartments 6 7 at the ends of the beam $c^4$ will each have a suitable leak device (shown as a small hole) to permit the water standing in the lower end of the beam to escape therefrom at the proper rate of speed. These holes are indicated at 60 and 70 in Fig. 1.

Having fully described my invention, what I claim as new, and desire to secure by Letters Patent, is—

1. In a photographic bath apparatus, a main and an auxiliary reservoir, a valve coacting with each of said reservoirs, and means to open and close said valve automatically at desired intervals of time to first discharge the water from said auxiliary reservoir and then discharge thereinto the water from the main reservoir.

2. In a photographic bath apparatus, a main and an auxiliary reservoir, a valve in each of said reservoirs, and means connecting said valves controlled by the overflow of water from the main reservoir to effect automatically the opening and closing of said valves to change the water in the auxiliary reservoir.

3. In a photographic bath apparatus, a main and an auxiliary reservoir, and a valve in each reservoir, combined with means intermediate said valves and controlled by water overflowing from the main reservoir to automatically open and close said valves to change at predetermined times the water in both said reservoirs.

4. In a photographic bath apparatus, a main and an auxiliary reservoir each having a valve, an overflow-conduit connected with said auxiliary reservoir, a device to close the open end of said conduit, said device being moved away from said conduit by the overflow of water into the conduit from the auxiliary reservoir.

5. In a photographic bath apparatus, a main and an auxiliary reservoir, a valve in each reservoir, and a lever connected with each valve, said levers being moved at intervals by water overflowing from the main reservoir and opening and closing said valves to supply the auxiliary reservoir with water at predetermined times.

6. In a photographic bath apparatus, a main and an auxiliary reservoir, a valve in each of said reservoirs, a lever connected with each valve, the valve of the main reservoir being closed when the valve of the auxiliary reservoir is open for the discharge of water therefrom.

In testimony whereof I have signed my name to this specification in the presence of two subscribing witnesses.

CHARLES S. L. KENNEDY.

Witnesses:

JOHN C. EDWARDS,

ELIZABETH R. MORRISON.